The specimen text was not ice print.
7130X
Parker & White
Coffee Mill.
Patented June 22, 1832.
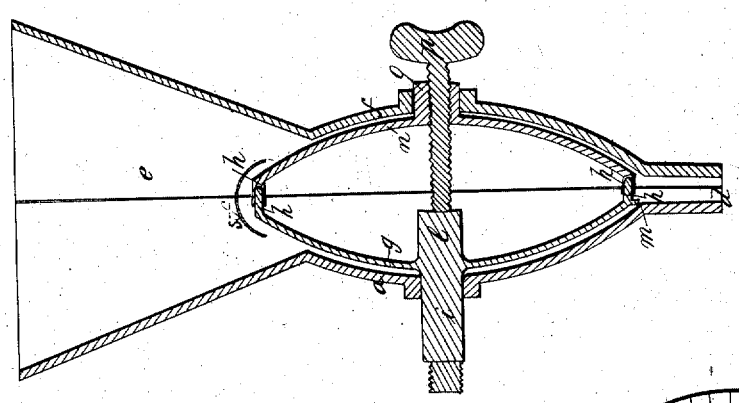
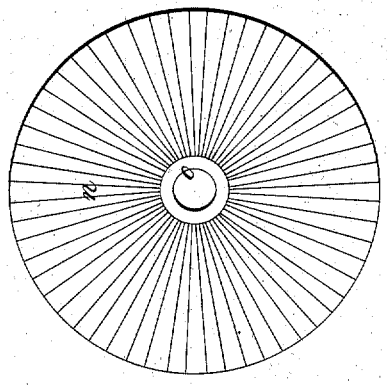
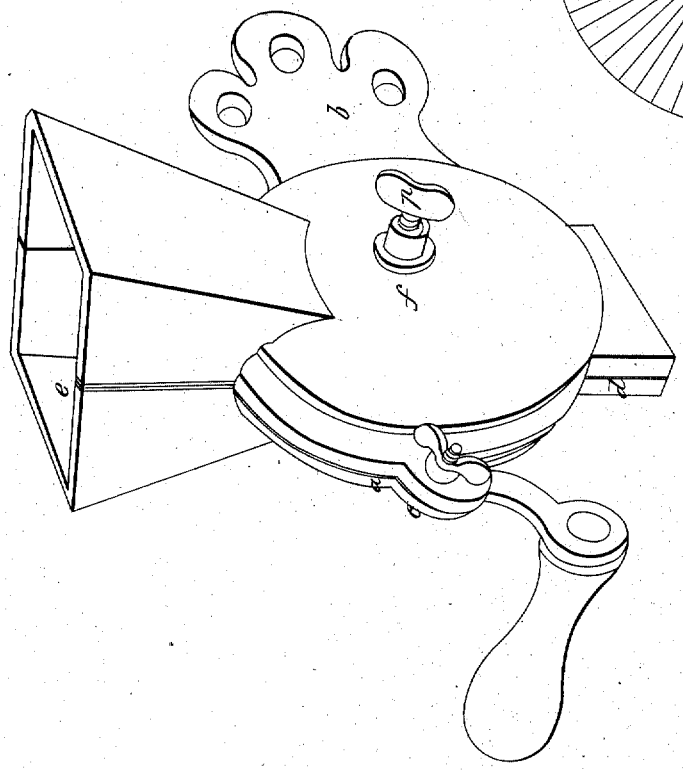

7130X June 22, 1832

Edmund Parker and Heman White's Coffee Mill
Letters Patent

The Schedule referred to in these Letters Patent and making part of the same containing a description in the words of the said Edmund Parker and Heman White themselves of their improvement in the Coffee & Spice Mill To all to whom these Presents shall come Be it known that we Edmund Parker and Heman White both of Meriden in the County of New Haven and State of Connecticut, have invented a new and useful improvement in Machinery for grinding Coffee and pepper, Spices of all kinds, &c. and that the following is a full and exact description of the construction and operation of the said Machine as invented or improved by us The Machine consists of two beds or shells and two runners all of cast iron or other suitable materials, and standing in a vertical position, as follows, to wit, the front bed or shell has projected from its inner edge a flange or plate for screwing it to the wall, and from its outer edge an ear or small plate for screwing it to the back shell. On the lower edge is a projection forming, when connected with a similar projection on the back plate, a discharge pipe. On the upper edge, rises half of the hopper, forming, when connected with the back bed, a hopper consisting of a square top, and four triangular sides. The inner cavity of the bed has floats or teeth diverging from the centre in right lines, spirally, or otherwise as may be convenient, and in the centre is a hole for the reception of a stem on the front runner. The back bed or shell is similar to the front bed, with this exception, to wit; it has no flange projecting from its inner edge, but instead thereof, it has two small ears or plates projecting from its outer and inner edges for the purpose of connecting it with the front bed. The back bed has a hole through its centre to receive a stem or screw on the back runner. There are two runners as before mentioned. The front runner has Drawing floats or teeth out from the centre in straight lines, spirally, or
otherwise, on a curved surface, agreeing in diameter and surface with
the teeth in the bed. This runner has one or more teeth, each about
one fourth of an inch in length projecting from its inner surface, near
the periphery of the runner, (and intended to operate upon a similar
tooth or teeth projecting from the inner surfaces of the back runner).
From the centre of the inner surface of the front runner projects a
stem half an inch or more in length for the purpose of receiving the
end of the thumb screw from the back runner. From the centre of the
outer surface of the front runner projects a stem or shaft having its end
properly squared to receive a crank. From the end thus squared pro-
jects a screw to receive a nut for fastening the crank. Near the outer
edge of this runner are guard teeth, intended to keep the teeth of the
runner and bed from wearing. The back runner is similar to
the front runner with these exceptions, to wit, it has no stem project-
ing from the centre of its inner surface, but a stem is projected from
the centre of its outer surface, having a hole through it cut with a
thread therein, to receive the said thumb screw which regulates
the grinding of the Mill. This thumb screw when the Mill is put in
operation, is screwed so as to press upon the end of the said stem pro-
jecting from the inner surface of the front runner. When thus screwed
up, it throws the runners apart (and) brings the grinding surfaces of
the runners against the grinding surfaces of the shells. Near the
lower part of the hopper and just above the opening between the two
runners when put together, a small curved plate of iron or other
materials of width sufficient to cover the said opening is inserted
into notches in the sides of the hopper, to prevent the coffee &c,
from passing whole into the opening. A crank of any convenient
form is fitted to the stem on the front runner. The Mill can be ap-
plied to a board (and fastened by that to a wall or post, instead of fast-
ening it by a flange. The machine thus constructed is in effect
two Mills combined. We claim as our invention or improvement,
the peculiar combination and ajustment of the two runners as 1853 7130x June 22, 1832 above described (and in the manner above specified, to produce the effect of grinding coffee and pepper, spices of all kinds, &c. &c.

Dated at Middletown the 31st day of May A.D. 1832.

Witnesses
Asa G. Bill
Jon.a Barnes

Edmund Parker
Herman White

812